United States Patent [19]

Najjar et al.

[11] Patent Number: 4,803,061

[45] Date of Patent: * Feb. 7, 1989

[54] PARTIAL OXIDATION PROCESS WITH MAGNETIC SEPARATION OF THE GROUND SLAG

[75] Inventors: Mitri S. Najjar, Hopewell Junction, N.Y.; Michael W. Becker, Westminster, Calif.

[73] Assignee: Texaco Inc., White Plains, N.Y.

[*] Notice: The portion of the term of this patent subsequent to May 22, 2004 has been disclaimed.

[21] Appl. No.: 947,122

[22] Filed: Dec. 29, 1986

[51] Int. Cl.$^4$ ............................................. C01B 31/18
[52] U.S. Cl. ............................ 423/415 A; 423/648.1; 423/113; 423/156; 252/373; 75/63; 48/197 R
[58] Field of Search ................. 252/373; 423/415 A, 423/113, 156, 648.1; 48/197 R; 75/63

[56] References Cited

U.S. PATENT DOCUMENTS

| | | | |
|---|---|---|---|
| 2,709,676 | 5/1955 | Krebs | 423/DIG. 16 |
| 3,542,532 | 11/1970 | Johnson et al. | 252/373 |
| 3,607,156 | 9/1971 | Schlinger et al. | 48/197 R |
| 3,607,157 | 9/1971 | Schlinger et al. | 423/632 |
| 3,673,080 | 6/1972 | Schlinger et al. | 208/131 |
| 3,916,617 | 11/1975 | McKenzie et al. | 252/373 |
| 3,920,579 | 11/1975 | Slater | 252/373 |
| 4,060,478 | 11/1977 | Lang | 252/373 |
| 4,331,529 | 5/1982 | Lambert et al. | 252/373 |
| 4,336,034 | 6/1982 | Lang et al. | 252/373 |
| 4,411,670 | 10/1983 | Marion et al. | 48/197 R |
| 4,431,622 | 2/1984 | Moss | 252/373 |
| 4,436,531 | 3/1984 | Estabrook et al. | 252/373 |
| 4,439,210 | 3/1984 | Lancet | 252/373 |
| 4,440,546 | 4/1984 | Lancet et al. | 252/373 |
| 4,466,807 | 8/1984 | Santen et al. | 252/373 |
| 4,657,698 | 4/1987 | Najjar et al. | 252/373 |
| 4,657,702 | 4/1987 | Vasconcellos et al. | 252/373 |
| 4,668,428 | 5/1987 | Najjar | 252/373 |
| 4,668,429 | 5/1987 | Najjar | 252/373 |
| 4,671,804 | 6/1987 | Najjar | 252/373 |
| 4,705,536 | 10/1987 | Becker et al. | 252/373 |
| 4,705,538 | 10/1987 | Najjar et al. | 252/373 |
| 4,705,539 | 10/1987 | Najjar et al. | 252/373 |

Primary Examiner—Robert L. Stoll
Assistant Examiner—Paige C. Harvey
Attorney, Agent, or Firm—Robert A. Kulason; James J. O'Loughlin; Albert Brent

[57] ABSTRACT

Synthesis gas is produced by the partial oxidation of a feedstock comprising petroleum coke and/or heavy liquid hydrocarbon fuel containing sulfur and having an ash that contains nickel, vanadium and silicon. An iron-containing or an iron and calcium-containing additive is introduced into the reaction zone along with the feed. The additive combines with at least a portion of the iron and nickel constituents and sulfur found in the feedstock to produce a liquid phase washing agent that collects and transports at least a portion of the vanadium-containing oxide laths and spinels and other ash components out the reaction zone. Slag and other particulate matter is separated from the effluent gas stream and ground to produce a heterogeneous mixture of magnetic and non-magnetic solid particles. The particles have various degrees of magnetic susceptibility and are thereby separated into the following three separate portions of magnetic particles: (1) particles of an Fe-Ni alloy, and a minor amount of magnetite particles; (2) particles of an oxysulfide phase of iron and nickel, a minor amount of particles of vanadium compounds, and particles of iron silicate and calcium silicate; and (3) particles of vanadium-containing spinels, and particles of metal silicates. The first and third portions are sent to a metal refiner to recover nickel and vanadium respectively. The second portion of magnetic particles having an increased Fe/V wt. ratio is recycled through the gasifier.

27 Claims, No Drawings

PARTIAL OXIDATION PROCESS WITH MAGNETIC SEPARATION OF THE GROUND SLAG

FIELD OF THE INVENTION

This invention relates to the partical oxidation of ash-containing heavy liquid hydrocarbonaceous fuesl, ash-containing petroleum coke, or mixtures thereof to produce gaseous mixtures comprising $H_2+CO$. It also pertains to an additive system for removing nickel and vanadium-containing contaminants along with other molten ash which are produced during the partial oxidation of a heavy liquid hydrocarbonaceous fuel having a nickel or vanadium-containing ash, petroleum coke having a nickel and vanadium-containing ash, or mixtures thereof to produce synthesis gas, reducing gas or fuel gas. More particularly, it pertains to a method for handling the slag and solid material that is entrained in the hot raw effluent gas stream from the synthesis gas generator, including magnetic separation to the slag into useful components.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the useful disposal of petroleum coke or ash-containing heavy liquid hydrocarbonaceous fuel without polluting the atmosphere. For example, water slurries of petroleum coke are reacted by partial oxidation in coassigned U.S. Pat. No. 3,607,157, which is incorporated herein by reference. Gasification is often cited as a convenient means of coke disposition. The decision to use gasification as a petroleum coke disposal means is generally based on economics. The expected rise in energy costs and legislation (primarily Canadian) requiring total use of feed crude should shortly bring about a great utilization of petroleum coke feeds to the partical oxidation gas generator.

Previous gasification runs with delayed coke and ash-containing heavy liquid hydrocarbonaceous fuel gave rise to some unexpected operating problems. The ash, which normally melts and is discharged from the gasifier as a slag, was not melting completely and being discharged but was building up on the walls of the refractory. Vanadium and nickel constituents of the ash, collected on the gasifier walls and formed oxides during shut-down. Upon subsequent exposure of the gasifier walls to air the deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions from troublesome nickel carbonyl deposits downstream in the system. These problems and others are minimized by the subject process in which the amount of vanadium constituents remaining in the reaction zone are substantially reduced or eliminated. One object of the present invention is to make possible an extended operation of the partial oxidation gas generator without any shut-down caused by failure of the refractory lining in the reaction zone that was brought about by the presence of vanadium. Another object of the subject process is to generate the slag from the hot raw effluent gas stream from the gas generator; and then to separate the slag magnetically into various useful portions. Advantageously, one large portion of the magnetically separated slag may be recycled to the gas generator, as a gas portion of the addition agent in admixture with the fuel feed in order to capture more vanadium and to facilitate removal of ash from the gasifier. Accordingly, by the subject process ash disposal and additive costs are substantially reduced. Valuable by-product vanadium and nickel may be recovered from other portions of the magnetically separated slag.

SUMMARY OF THE INVENTION

According to a first aspect of the present invention, there is provided process for the production of gaseous mixtures comprising $H_2+CO$ by the partial oxidation of a feedstock comprising a heavy liquid hydrocarbonaceous fuel having a nickel- and vanadium-containing ash or petroleum coke having a nickel- and vanadium-containing ash, or mixtures thereof; and said feedstock includes a minimum of 0.5 wt. % of sulfur and said ash includes a minimum of 5.0 wt. % vanadium, a minimum of 2.0 wt. % of nickel, and silicon; said process be characterized by the steps of:

(1) mixing together with said feedstock, additive A comprising an iron-containing additive when the silicon content of said feedstock is less than about 350 ppm, or additive B comprising an iron- and calcium-containing additive when the silicon content of said feedstock is about 400 ppm or more, wherein the weight ratio of additive A or B to ash in the reaction zone in (2) is in the range of about 1.0–10.0 to 1.0, and for each part by weight of vanadium there is at least 10 parts by weight of iron when additive A is used, or at least 10 parts by weight of iron plus calcium when additive B is used;

(2) reacting said mixture from (1) at a temperature in the range of about 2200° F. to 3000° F. and a pressure in the range of about 5 to 250 atmospheres in a down-flow free-flow refractory-lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of the reaction zone; and when additive B is used separate portions of said iron- and calcium-containing additive (I) combine with a portion of said nickel, calcium and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase remaining portion of said vanadium-containing oxide laths and spinels and other ash components;

(3) cooling and cleaning said hot raw effluent gas stream from (2) by direct contact with water in a quench zone to produce an aqueous suspension of slag and other small solid particles;

(4) grinding and drying the slag and other particulate solids from (3) to produce a ground heterogeneous mixture of particles having varying magnetic susceptibilities, and non-magnetic solid particles; wherein said ground mixture of particles has a particle size of less than 180 microns, and a moisture content of less than 3.0 wt. %;

(5) introducing a thin portion of said ground mixture of solid particles from (4) between the poles of an electromagnet having a low range magnetic field strength and separating a first portion of magnetic particles from a first residue mixture of magnetic and non-magnetic particles; wherein said first portion of magnetic particles comprises a heterogeneous mixture of particles that substantially comprises particles of an Fe-Ni alloy, and a minor amount of magnetite particles; and said Fe-Ni alloy substantially comprises about 70–95 wt % Fe and the remainder Ni, and said Ni comprises about 40 to 85 wt. % of the total amount of nickel present in the ground mixture of solid particles from (4); and said first portion of magnetic particles comprises about 0.2 to 5.0 wt. % of the ground mixture of solid particles from (4);

(6) introducing said first residue mixture of magnetic and non-magnetic particles from (5) between the poles of an electromagnet having a medium range magnetic field strength, and separating a second portion of magnetic particles from a second residue mixture of magnetic and non-magnetic particles; wherein said second portion of magnetic particles substantially comprises a heterogeneous mixture of particles which have a lesser magnetic susceptibility than that of the particles in said first portion of magnetic particles, and which substantially comprise particles of an oxy-sulfide phase of Fe and Ni; a minor amount of particles of vanadium compounds; and particles of the silicates of iron and calcium; and said second portion of magnetic particles substantially comprises about 85 to 98 wt. % of the ground mixture of solid particles from (4) and contains about 70 to 95 wt. % of the iron; and (7) introducing the second residue mixture of magnetic and non-magnetic particles from (6) between the poles of an electromagnet having a high range magnetic field strength, and separating a third portion of magnetic particles from a third residue mixture of particles; wherein said third portion of magnetic particles substantially comprises a heterogeneous mixture of particles which have a lesser magnetic susceptibility than that of the particles in said second portion of magnetic particles, and which substantially comprise particles of a vanadium-containing spinel; and a mixture of particles comprising at least one metal silicate with said metal portion being selected from the group consisting of iron, magnesium, aluminum, calcium, and mixtures thereof; and said third portion of magnetic particles substantially comprises about 1 to 14 wt. % of the ground mixture of solid particles from (4) and contains about 60 to 98 wt. % of the vanadium in said mixture from (4).

According to a second aspect of the present invention, there is provided a process for the production of gaseous mixtures comprising $H_2+CO$ by the partial oxidation of a feedstock comprising a heavy liquid hydrocarbonaceous fuel having a nickel- and vanadium-containing ash, or mixtures thereof; and said feedstock includes a minimum of 0.5 wt. % of sulfur; and said ash includes a minimum of 5.0 wt. % vanadium, a minimum of 2.0 wt. % of nickel, and silicon; said process comprising:

(1) mixing together with said feedstock, additive A comprising an iron-containing additive when the silicon content of said feedstock is less than about 350 ppm, or additive B comprising an iron and calcium-containing additive when the silicon content of said feedstock is about 400 ppm or more; wherein the weight ratio of additive A or B to ash in the reaction zone in (4) is in the range of about 1.0–10.0 to 1.0, and for each part by weight of vanadium there is at least 10 parts by weight of iron when additive A is used, or at least 10 parts by weight of iron plus calcium when additive B is used;

(2) coking said mixture from (1) to produce petroleum coke having a nickel- and vanadium-containing ash and having dispersed therein said additive A or B;

(3) introducing the petroleum coke from (2) into a partial oxidation reaction zone as a pumpable slurry of petroleum coke in water, liquid hydrocarbonaceous fluid or mixtures thereof, or as substantially dry petroleum coke entrained in a gaseous transport medium;

(4) reacting said mixture from (1) at a temperature in the range of about 2200° F. to 3000° F. and a pressure in the range of about 5 to 250 atmospheres in a free-flow refractory-lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of reaction zone; and when additive B is used separate portions of said iron- and calcium-containing additive (I) combine with a portion of said nickel, calcium and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase that fluxes substantially all of the remaining portion of said vanadium-containing oxide laths and spinels and other ash components;

(5) cooling and cleaning said hot raw effluent gas stream from (4) by direct contact with water in a quench zone to produce an aqueous suspension of slag and other small solid particles;

(6) grinding and drying the slag and other particulate solids from (5) to produce a ground heterogeneous mixture of particles having varying magnetic susceptibilities, and non-magnetic solid particles; wherein said ground mixture of particles has a particle size of less than 180 microns, and a moisture content of less than 3.0 wt. %;

(7) introducing a thin portion of said ground mixture of solid particles from (6) between the poles of an electromagnet having a low range magnetic field strength and separating a first portion of magnetic particles from a first residue mixture of magnetic and non-magnetic particles; wherein said first portion of magnetic particles comprises a heterogeneous mixture of particles that substantially comprises particles of an Fe-Ni alloy, and a minor amount of magnetite particles; and said Fe-Ni alloy substantially comprises about 70–95 wt % Fe and the remainder Ni, and said Ni comprises about 40 to 85 wt. % of the total amount of nickel present in the ground mixture of solid particles from (6); and said first portion of magnetic particles comprises about 0.2 to 5.0 wt. % of the ground mixture of solid particles from (6);

(8) introducing said first residue mixture of magnetic and non-magnetic particles from (7) between the poles of an electromagnet having a medium range magnetic field strength, and separating a second portion of magnetic particles from a second residue mixture of magnetic and non-magnetic particles; wherein said second portion of magnetic particles substantially comprises a heterogeneous mixture of particles which have a lesser magnetic susceptibility than that of the particles in said first portion of magnetic particles, and which substantially comprise particles of an oxy-sulfide phase of Fe and Ni; a minor amount of particles of vanadium compounds; and particles of the silicates of iron and calcium; and said second portion of magnetic particles substantially comprises about 85 to 98 wt. % of the ground mixture of solid particles from (4) and contains about 70 to 95 wt. % of the iron; and (9) introducing the second residue mixture of magnetic and non-magnetic particles from (8) between the poles of an electromagnet having a high range magnetic field strength, and separating a third portion of magnetic particles from a third residue mixture of particles; wherein said third portion of magnetic particles substantially comprises a heterogeneous mixture of particles which have a lesser magnetic susceptibility than that of the particles in said second portion of magnetic particles, and which substantially comprise particles of a vanadium-containing spinel; and a mixture of particles comprising at lease one metal silicate with said metal portion is selected from the group consisting of iron, magnesium, aluminum, calcium, and mixtures thereof; and said third portion of magnetic particles substantially comprises about 1 to 14 wt. % of the ground mixture of solid particles from (6) and contains about 60 to 98 wt. % of the vanadium in said mixture from (6).

DISCLOSURE OF THE INVENTION

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the nickel and vanadium rich ash-containing heavy liquid hydrocarbonaceous fuel and petroleum coke feedstocks that are used in the subject process are economically attractive.

By definition, the term heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term petroleum coke having a nickel and vanadium-containing ash is petroleum coke made from ash containing heavy liquid hydrocarbonaceous fuel by conventional delayed or fluid coking processes, such as described in coassigned U.S. Pat. No. 3,673,080, which is incorporated herein by reference.

Closer study of the ash derived from the partial oxidation of heavy liquid hydrocarbonaceous fuels and/or petroleum coke shows that they are largely composed of oxide compounds of vanadium, nickel, iron, along with some normally occurring mineral matter species similar to that found in coal mineral matter. However, the metals present in the ash provide a system that is significantly different from that occurring in coal. A further factor is that the total ash content of the petroleum coke may be only about 0.1 to 5 weight percent (wt.%), whereas coal typically contains 10–20 wt.% ash. The comparatively low ash concentration in petroleum coke apparently is the reason that the ash removal problem is only noticed after prolonged gasifier runs of a partial oxidation gas generator. The chance for effective ash/additive mixing that is necessary to wash the vanadium constituents out of the reaction zone is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Ash from heavy liquid hydrocarbonaceous material or petroleum coke ash comprises mostly the oxides and possibly the sulfides of Ni, V, and Fe along with a minor amount of the oxides selected from the group consisting of Si, Al, Ca, Ti, Cr, and mixtures thereof. While the metal concentrations in the heavy liquid hydrocarbonaceous material may comprise Ni 0.5 to 610 ppm (part per million), V 2.0–1500 ppm, and Fe 0.5 to 75 ppm; the metal concentrations in the petroleum coke product may comprise Ni 20 to 3100 ppm, V 50 to 7400 ppm, and Fe 2.0 to 1300 ppm.

This invention involves the use of an iron-containing additive comprising elemental iron and/or an iron compound with or without a calcium compound. More particularly, it is proposed to employ an iron-containing additive A when the feedstock in use yields an ash with a silicon content of less than about 350 ppm, and the an iron and calcium containing additive B when the feedstock in use yields an ash with a silicon content of about 400 ppm or more. Further, a means of introducing these additives (otherwise called "addition agents") into the system to give maximum effectiveness is provided. Reference is made to co-assigned U.S. patent application Ser. Nos. 749,375 and 749,376, now co-assigned U.S. Pat. Nos. 4,668,428 and 4,668,499 respectively, which are incorporated herein by reference.

In addition, the invention described herein pertains to the novel method for handling the slag and solid material that is entrained in the hot raw effluent gas stream from the synthesis gas generator. The slag and other particulate matter is separated from the effluent gas stream and ground to produce a heterogeneous mixture of magnetic and non magnetic solid particles. The heterogeneous magnetic particles have various degrees of magnetic susceptibilities and are thereby separated by successive electromagnetic exposures to successively increasing field strengths. By this means there may be produced, for example, three separate portions of magnetic particles substantially comprising: (1) particles of an Fe-Ni alloy; and a minor amount of magnetite particles; (2) particles of an oxy-sulfide phase of Fe and Ni; particles of a vanadium compound e.g. oxide; and particles of the silicates of iron and calcium; and (3) particles of vanadium containing spinels; and particles of at least one metal silicate selected from the group of metals consisting of iron, magnesium, aluminum, calcium and mixtures thereof. The first and third portions of magnetic particles may be sent to a metal refiner to recover nickel and vanadium respectively. The second portion of magnetic particles is preferrably recycled; and, as a portion of the iron-containing additive, it is mixed with fresh fuel feedstock to the gas generator.

Advantageously, by the subject process, the vanadium content of the recycled second portion of magnetic particles comprising iron-containing slag is substantially reduced. This recycled fraction is capable of picking up more vanadium upon being recycled and passed through the gasifier; and, the carbon values in the slag may be converted into more synthesis gas. Further, the amount of supplemental ash condition agent is reduced; and savings in the cost of the additive are thereby effected. Also, the vanadium and nickel may be recovered as valuable by-products.

The iron-containing additive A comprises elemental iron and/or an iron compound, preferably iron oxide. For example, the mixtures of elemental iron and an iron compound may comprise from about 0 to 100 wt. % of either elemental iron or an iron compound and the remainder of the mixture substantially comprises the other ingredient, if any.

Additive A may contain iron compounds selected from the group consisting of oxides, sulfides, sulfates, carbonates, cyanides, chlorides, nitrates and mixtures thereof. The calcium compounds and any iron compounds in additive B may be selected from the same group of compounds as previously listed for additive A. Further, the iron-containing portion of additive A or B may comprise a ferro or ferri organic compound selected from the group consisting of naphthenates, oxalates, acetates, citrates, benzoates, oleates, tartrates, and mixtures thereof. Additive A or B may include a water soluble iron salt. Preferably, additive A may comprise iron oxide; and additive B may comprise iron oxide in admixture with calcium oxide. At least 30.0 wt. % of additive A or B is constituted of elemental iron and/or an iron compound. Additive B preferably comprises from about 30.0 to 90.0 wt. % of elemental iron and/or iron compound and the remainder substantially comprises a calcium compound. By mixing additive A or B with the fuel feed a portion of the sulfur in the feedstock may be removed as the sulfides of iron and nickel. By this means sulfur may leave the reaction zone in the slag.

In the reaction zone of the partial oxidation gas generator, the additive combines with at least a portion, such as substantially all or a large fraction e.g. about 40 to 100 wt. %, for example about 70 to 90 wt. % or the nickel constituents and sulfur found in the feedstock to produce a low viscosity liquid phase washing agent or carrier. Advantageously, the sulfur potential in the gas and downstream gas cleaning costs are substantially reduced or possibly eliminated. This washing agent is in the liquid phase at the temperature prevailing in the reaction zone and substantially comprises in wt. %: iron sulfide about 75 to 95, such as about 80 or 90; nickel sulfide about 0.5 to 3, such as about 1 to 2; and iron oxide about 2 to 9, such as 3 to 6. The viscosity of this washing agent at 2000° F. is in the range of about 10 to 20 poises. Further, it was unexpectedly found this liquid phase washing agent has a strong wetting capability for the high temperature non-flowing vanadium-containing oxide laths and spinels. This washing agent functions in a completely different manner that that of a fluxing additive which may be used for example to solubilize slag constituents in coal. For example, this washing agent does not solubilize the troublesome vanadium-containing oxide laths and spinels. Rather, it serves as a carrier and washes them out of the reaction zone. This washing agent washes them out of the reaction zone. This washing agent washes at least a portion, such as from about 40 to 100 wt. %, such as about 60 to 80 wt. %, and preferably all, of the vanadium-containing contaminants out of the reaction zone of the partial oxidation gas generator. The mixture of this liquid phase washing agent and vanadium oxide is referred to herein as slag and comprises about 1 to 10 wt. %, such as about 4 to 8 wt. % of vanadium oxide. Further, it was unexpectedly found that high silicon e.g. greater than about 350 ppm would interfere with the formation of the liquid phase washing agent in the partial oxidation reaction zone.

It was unexpectedly found that other benefits could be achieved by including, in additive A or B an additional material selected from the group of elements consisting of magnesium, chromium, and mixtures thereof. The elements are provided as suitable compounds selected from the groups consisting of oxides, hydroxides, carbonates, bicarbonates, sulfates, nitrates and mixtures thereof. The total amount of the compounds of magnesium, chromium, and mixtures thereof in the additive may be in the range of about 1.0 to 10.0 wt. %, such as about 2.0 to 8.0 wt. % of the additive. The addition of the aforesaid supplemental amount of magnesium and/or chromium compound saturates the slag with respect to these constituents thereby preventing their dissolution from the refractory. The life of the refractory lining is thereby extended.

A suitable amount of additive A or B is introduced into the reaction zone along with the fuel feedstock in order to satisfy the following two ratios: (i) a wt. ratio of iron-containing additive to ash (noncombustible material) in the reaction zone in the range of about 1.0–10.0 to 1.0, such as at least 2:1 weight ratio, for example about 5.0 parts by wt. % of iron containing additive per part by wt. of ash in the feedstock; and (ii) for each part by weight of vanadium there is at least 10 parts by weight, such as about 10–30, for example 20 parts by weight of iron when additive A is used, or at least 10 parts by weight of iron plus calcium when additive B is used.

Advantageously by the subject process, the molten slag produced in the reaction zone has a low viscosity e.g. less than about 20 poises at 2000° F., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature from about 2200° F. to 3000° F., such as about 2300° F. to 2700° F.; for example about 2725° F. to 2825° F.; pressure from about 5 to 250 atmospheres, such as about 15 to 200 atmospheres. When steam or water is used as a temperature moderator, the $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the partial oxidation gas generator is about as follows, in mole percent: $H_2$: 10 to 70; CO 15 to 57; $CO_2$ 0.1 to 25, $H_2O$ 0.1 to 20, $CH_4$ nil to 60; $H_2S$ nil to 2; COS nil to 0.1; $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering the gas stream may be employed as synthesis gas, reducing gas or fuel gas.

In one operation of the process described herein, the aforesaid mixture of fuel feedstock comprising heavy liquid hydrocarbonaceous material having a nickel and vanadium-containing ash and/or petroleum coke having a nickel and vanadium-containing ash are introduced, together with additive A or B into the partial oxidation gasifier. The amount of addition agent is critical to obtaining the washing effect in the gasifier. In another operation, the iron-containing additive is mixed with the heavy liquid hydrocarbonceous material having a nickel- and vanadium-containing ash and the mixture is then fed into a conventional coking unit to produce petroleum coke. By this means, the finely ground iron-containing agent may be intimately mixed throughout the petroleum coke product. The preferable particle size of the comminuted iron-containing addition agent and the comminuted petroleum coke is in the range of ASTM E-11 Standard Sieve Designation about 150 microns to 38 microns, or smaller. The ingredients may be separately ground and then mixed together. Alternatively, the ingredients may be wet or dry ground together. Intimate mixing of the solid materials is thereby achieved, and the particle sizes of each of the materials in the mixture may be substantially the same. The dry ground mixture may be mixed with water or a liquid hydrocarbonaceous material or both to produce a pumpable slurry having a solids content in the range of about 50–70 wt.%, such as about 58–66 wt. %. Alternatively, the solid materials may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground addition agent A or B is mixed with the heavy liquid hydrocarbonaceous fuel having a nickel-vanadium-containing ash and fed into a coker, the actual operation can be accomplished for example by mixing addition agent A or B into the ash-containing petroleum liquid feed to the vacuum distillation tower, which normally precedes the coker unit. In either unit operation (coking or distillation), the agent should predominately stay behind in the desired bottoms stream. In other words, there should be little, if any, carry over of addition agent with the lighter products. A possible advantage for mixing the agent into the vacuum tower feedstream in preference to the bottoms stream (i.e. coker feed) is that the feed to the vacuum tower is significantly less viscous than the bottoms from the vacuum tower. A more thorough mixing may be thereby effected.

For example, a mixture of high boiling liquid petroleum i.e. heavy liquid hydrocarbonaceous fuel having a nickel and vanadium-containing ash and comminuted addition agent A or B at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke having a nickel- and vanadium-containing ash and having uniformly dispersed therein said addition agent A or B is removed from the bottom of said delayed coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems as discussed for petroleum coke. Thus, the invention of introducing addition agent A or B as part of the petroleum processing prior to gasification should, depending on the specific process, produce a gasifier feed that will be free of the gasification problems mentioned above. Most of these processes employ vacuum distillation as pretreatment. Accordingly, as described above, the addition agent A or B may be mixed with the vacuum distillation feed having a vanadium-containing ash. The agent then will emerge from the distillation column in the bottoms stream. In turn, the bottoms stream is the feed stream for the upgrading process. This incorporation of addition agent A or B should not adversely affect these processes, and the iron-containing addition agent should ultimately emerge with the vanadium-rich residue stream from each respective process. In all these processes, this residue stream should be suitable for gasification by partial oxidation.

In still another embodiment of the invention, it was unexpectedly found that the softening temperature of the iron-containing addition agent could be reduced about 100°–300° F., such as about 200° F., at start-up by mixing a calcium compound with it and the previously described feedstock e.g. petroleum coke, liquid hydrocarbonaceous fuel, or mixtures thereof. The calcium compound may be selected from the group consisting of calcium oxide, calcium carbonate and calcium hydroxide. By adding calcium in this manner, the partial oxidation gas generator may be started up at a lower temperature e.g. about 200° to 300° F. lower. The calcium compound is introduced into the partial oxidation reaction zone in admixture with the feedstock and/or iron-containing addition agent in the critical amount of about 2.0 to 8.0 wt. % or below of the iron-containing addition agent. A. The calcium compound will lower the softening temperature of the iron-containing addition agent, thus enhancing the rate of sulfur pick-up in the slag. After the sulfur begins to transfer into the molten slag, the liquid sulfide slag of iron and nickel will lower the softening temperature of the iron-containing agent thus eliminating the need of introducing calcium.

The hot raw effluent gas stream from the partial oxidation reaction zone is cooled with water in a quench zone, such as that described in coassigned U.S. Pat. No. 3,607,157. The solid particles in the aqueous suspension of slag particles and bits of refractory, if any from the bottom of the quench tank are separated from the water, ground, and dried to less than about 3.0 wt.% of water, such as about 1.0 wt. % of water, or below. Any combination of conventional dewatering means e.g. settler, hydroclone, filter may be used. The solid particles may be wet or dry ground by any conventional means such as a ball or red mill to a particle size of less than 180 microns, such as between about 30 to 150 microns.

The elemental composition of the ground slag particles and other solids comprising the heterogeneous mixture of magnetic particles of various magnetic susceptibilities and non-magnetic particles is shown in Table I in wt. %. The elements listed are present in the mixture in combination with other elements.

TABLE I

Composition of Ground Slag and Particulate Solids From Quench Tank - wt. %.

| | |
|---|---|
| Iron about 40-65, such as 45-60 | aluminum about 0-3, such as 0.1-1 |
| Nickel about 0.1-5, such as 0.5-3 | calcium about 0-8, such as 0.2-5 |
| Silicon about nil - 4, such as 0.2-2 | chromium about 0-2, such as 0.2-1 |
| Vanadium about 0.1-5, such as 0.5-3 | magnesium about 0-3, such as 0.1-1 |
| Carbon about 0.1-10, such as 0.1-4 | |

Originally, a thin portion e.g. about 38 to 600 microns thick of the ground mixture of magnetic and nonmagnetic particles are introduced between the poles of an electromagnet having a low range magnetic field strength e.g. about 10 to 1000 gausses, such as about 20 to 75 gausses. A first portion of magnetic particles representing about 0.2 to 5.0 wt. % of the original portion of ground particles are thereby separated from a first residue mixture of magnetic and non-magnetic particles. The first portion of magnetic particles substantially comprises a heterogeneous mixture comprising particles of iron-nickel alloy; and a minor amount, if any, of magnetite ($Fe_3O_4$) particles. For example, there may be about 0 to 10 wt. %, such as about 0.05 to 5.0 wt. % of magnetite in the first portion of magnetic particles. The iron-nickel alloy in the first portion of magnetic particles substantially comprises about 70-95 wt. % Fe, and the remainder nickel. Said nickel comprises about 40 to 85 wt. %, such as about 50 to 70 wt., %, of the total amount of nickel present in the original portion of the ground slag and other solids. Optionally, the first portion of magnetic particles may be sent to a metal refiner to recover by-product valuable nickel by conventional methods.

A thin layer e.g. about 38 to 600 microns thick of the first residue mixture of magnetic and non-magnetic particles after the first magnetic exposure of the original portion of ground slag and other solids is introduced between the poles of an electromagnet having a medium range magnetic field strength e.g. about 1,000 to 10,000 gausses, such as about 2,500 to 7,500 gausses. A second portion of magnetic particles representing about 85 to 98 wt. % of the ground mixture of solid particles in the original portion of ground particles of slag and other solids are thereby separated from a second residue mixture of magnetic and non-magnetic particles. The magnetic susceptibility of the heterogeneous second mixture of magnetic particles is less than that of the first mixture of magnetic particles. The second portion of magnetic particles substantially comprises a heterogeneous mixture comprising about 92 to 98 wt. % of particles comprising an oxy-sulfide phase of Fe and Ni, e.g. a solid solution of Fe and Ni oxy-sulfide; a minor amount e.g. about 0.1 to 2 wt. % of vanadium compounds, and the remainder comprises particles comprising the silicates of iron and calcium. The oxy-sulfide phase of Fe and Ni substantially comprises about 45 to 70 wt. % Fe, such as about 50 to 60 wt. % Fe; and the remainder comprises Ni. From about 70 to 95 wt. % of the iron in the original portion of ground slag and other solid materials is removed during the second electro-magnetic exposure. The atomic ratio Fe/V in the second portion of magnetic particles is in the range of about 22 to 600, such as about 30 to 130. The second portion of magnetic particles is recycled to the gas generator in admixture with fresh fuel feedstock and make-up iron containing additive. Advantageously, by the subject process the amount of make-up iron-containing additive A or B is reduced thereby at a great economic advantage.

A thin layer e.g. about 38 to 600 microns thick, of the second residue mixture of magnetic and non-magnetic particles after the second magnetic exposure is introduced between the poles of an electromagnet having a high range magnetic field strength e.g. about 8,000 to 40,000 gausses, such as about 15,000 to 30,000 gausses. A third portion of magnetic particles representing about 1 to 14 wt. %, such as about 4 to 8 wt. % of the original portion of ground particles of slag and other solid materials are thereby separated from a third residue mixture of particles. The third portion of magnetic particles substantially comprises a heterogeneous mixture of particles whose magnetic susceptibility is less than that of the second portion of magnetic particles. The third portion of magnetic particles substantially comprises a heterogeneous mixture of particles comprising about 20 to 50 wt. % of particles comprising vanadium-containing spinels, and the remainder comprising a mixture of particles comprising at least one metal silicate with the metal portion being selected from the group consisting of iron, magnesium, aluminum, and calcium, and mixtures thereof. From about 60 to 98 wt. % such as about 70 to 90 wt. % of the vanadium in the original portion of ground slag and other solid materials may be found in the third portion of magnetic particles. Optionally, the third portion of magnetic particles may be sent to a metals refiner to recover valuable by-product vanadium.

In one embodiment, the separator comprises an electromagnet having two long pole pieces with a long narrow air gap of a gradually varying width between the pole pieces. The ground and dried mixture of slag and particulates solids to be separated is fed into the space between the pole pieces and travels parallel to their length. The particles with the higher magnetic susceptibility are urged toward the narrow side of the air gap. The grains are intercepted by a dividing edge which directs the two fractions into separate containers. The portion of particles representing the lower magnetic susceptibility is then fed into the space between the pole pieces after the field strength is increased. The process may be repeated for a plurality of separations. The magnetic system may be oriented in any direction with respect to gravity. A suitable magnetic separator may be obtained from S. G. Frantz, Co., Trenton, N.J. The Frantz separator has an inclined vibrating chute mounted centrally between the pole pieces of an electromagnet with a side slope of about 20° and a forward slope of about 30°. The electromagnet current is adjustable from 0 to 2.5 amperes.

Various modifications of the invention as herein before set forth may be made without departing from the spirit and scope thereof, and therefore, only such limitations should be made as are indicated in the appended claims.

We claim:

1. A process for the production of gaseous mixtures comprising $H_2+CO$ by the partial oxidation of a feedstock comprising a heavy liquid hydrocarbonaceous fuel having a nickel- and vanadium-containing ash or petroleum coke having a nickel- and vanadium-containing ash, or mixtures thereof; and said feedstock includes a minimum of 0.5 wt. % of sulfur and said ash includes a minimum of 5.0 wt. % vanadium, a minimum of 2.0 wt. % of nickel, and silicon; comprising the steps of:

(1) mixing together with said feedstock, additive A comprising an iron-containing additive when the silicon content of said feedstock is less than about 350 ppm, or additive B comprising an iron- and calcium-containing additive when the silicon content of said feedstock is about 400 ppm or more, wherein the weight ratio of additive A or B to said ash is in the range of about 1.0–10.0 to 1.0, and for each part by weight of vanadium there is at least 10 parts by weight of iron when additive A is used, or at least 10 parts by weight of iron plus calcium when additive B is used;

(2) reacting the mixture from (1) at a temperature in the range of about 2200° F. to 3000° F. and a pressure in the range of about 5 to 250 atmospheres in a free-flow refractory-lined partial oxidation reaction zone with a free-oxygen containing gas in the presence of a temperature moderator and in a reducing atmosphere to produce a hot raw effluent gas stream comprising $H_2+CO$ and entrained molten slag including vanadium-containing oxide laths and spinels; and where in said partial oxidation reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of reaction zone; and when additive B is used separate portions of said iron- and calcium-containing additive (I) combine with a portion of said nickel, calcium and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase that fluxes substantially all of the remaining portion of said vanadium-containing oxide laths and spinels and other ash components;

(3) cooling and cleaning said hot raw effluent gas stream from (2) by direct contact with water in a quench zone to produce an aqueous suspension of slag and other small solid particles;

(4) grinding and drying the slag and other particulate solids from (3) to produce a ground heterogeneous mixture of particles having varying magnetic susceptibilities, and non-magnetic solid particles; wherein said ground heterogeneous mixture of particles has a particle size of less than 180 microns, and a moisture content of less than 3.0 wt. %;

(5) separating said ground heterogeneous mixture of particles from (4) by electromagnetic means including spaced apart poles by introducing a portion of said ground heterogeneous mixture of solid particles from (4) about 38 to 600 microns thick between the poles of said electromagnetic means having a low magnetic field strength in the range of about 10 to 1000 gausses, and separating a first portion of magnetic particles from a first residue mixture of magnetic and non-magnetic particles; wherein said first portion of magnetic particles comprises a heterogeneous mixture of particles of an Fe-Ni alloy and about 0 to 10 wt. % of magnetite particles; and said Fe-Ni alloy comprises about 70–95 wt. % Fe and the remainder Ni, and said Ni comprises about 40 to 85 wt. % of the total amount of nickel present in the ground mixture of solid particles from (4); and said first portion of magnetic particles comprises about 0.2 to 5.0 wt. % of the ground mixture of solid particles from (4);

(6) separating said heterogeneous mixture of particles from (5) by electromagnetic means including spaced part poles by introducing a portion of said first residue mixture of magnetic and non-magnetic particles from (5) about 38 to 600 microns thick between the poles of said electromagnetic means having a medium magnetic field strength in the range of about 1,000 to 10,000 gausses, and separating a second portion of magnetic particles from a second residue mixture of magnetic and non-magnetic particles; wherein said second portion of magnetic particles comprises a heterogeneous mixture of particles which have a lesser magnetic susceptibility than that of the particles in said first portion of magnetic particles, and which comprises particles of a solid portion of Fe and Ni oxy-sulfide; about 0.1 to 2.0 wt. % of particles of vanadium compounds; and particles of iron silicate and calcium silicate; and said second portion of magnetic particles comprises about 85 to 98 wt. % of the ground mixture of solid particles from (4) and contains about 70 to 95 wt. % of the iron; and (7) separating said heterogeneous mixture of particles from (6) by electromagnetic means including spaced apart poles by introducing a portion of said second residue mixture of magnetic and non-magnetic particles from (6) about 38 to 600 microns thick between the poles of said electromagnetic means having a high magnetic field strength in the range of about 8,000 to 40,000 gausses, and separating a third portion of magnetic particles from a third residue mixture of particles; wherein said third portion of magnetic particles comprises a heterogeneous mixture of particles which have a lesser magnetic susceptibility than that of the particles in said second portion of magnetic particles, and which comprises particles of a vanadium-containing spinel; and a mixture of particles comprising at least one metal silicate wherein the metal in said metal silicate is selected from the group consisting of iron, magnesium, aluminum, calcium, and mixtures thereof; and said third portion of magnetic particles comprises about 1 to 14 wt. % of the ground mixture of solid particles from (4) and contains about 60 to 98 wt. % of the vanadium in said mixture from (4).

2. The process of claim 1 provided with the step of grinding the slag and other particulate-solids in step (4) in a ball mill to produce a ground heterogeneous mixture of particles having a particle size in the range of about 38 to 150 microns.

3. The process of claim 1 where in step (5) the ground mixture of solid particles from (4) that is introduced between the poles of an electromagnet has a thickness in the range of about 38 to 600 microns.

4. A process according to claim 1 wherein said heavy liquid hydrocarbonaceous fuel having nickel- and vanadium-containing ash feedstock is selected from the group consisting of virgin crude, residua from petroleum distillation and cracking process operations, petroleum distillation and cracking process operations, petroleum distillate, reduced crude, whole crude, asphalt, coal tar, coal derived oil, shale oil, tar sand oil, and mixtures thereof.

5. A process according to claim 1 wherein said heavy liquid hydrocarbonaceous fuel having a nickel- and vanadium-containing ash is a pumpable slurry of petroleum coke in water.

6. A process according to claim 1 wherein said additive A contains iron compounds selected from the group consisting of oxides, sulfides, sulfates, carbonates, cyanides, chlorides, nitrates, and mixtures thereof.

7. A process according to claim 1 wherein said additive B contains elemental iron, iron compounds mixtures thereof and calcium compounds, said iron and calcium compounds are selected from the group consisting of oxides, sulfides, sulfates, carbonates, cyanide, chlorides, nitrates, and mixtures thereof.

8. A process according to claim 1 wherein the iron-containing portion of additive A or B comprises a ferro or ferri organic compound selected from the group consisting of naphthenates, oxalates, acetates, citrates, benzoates, oleates, tartrates, and mixtures thereof.

9. A process according to claim 1 wherein the additive A or B comprises a water-soluble iron salt.

10. A process according to claim 1 including the step of introducing said additive A or B into the feed or to the bottoms from a vacuum distillations unit, in order to effect said step of mixing.

11. A process according to claim 1 wherein said mixture of additive A or B and feedstock which is the product of mixing step (1) has a particle size not larger than about 150 microns.

12. A process according to claim 1 wherein at least 30.0 wt. % of the additive A or B is constituted of elemental iron an iron compound and mixtures thereof, said iron compound is selected from the group consisting of oxides, sulfides, sulfates, carbonates, cyanide chlorides, nitrates, and mixtures thereof.

13. A process according to claim 1 including the step of mixing in step (1) sufficient of additive A or B to permit conversion of substantially all of the sulfur in said feedstock into the sulfides of iron and nickel, so that said sulfur may leave the reaction zone in the slag.

14. A process according to claim 1 in which additive A is used and including the steps of (a) introducing a calcium compound in the amount of from about 2.0 to 8. wt. % of said iron-containing addition agent A into the reaction zone of the partial oxidation reaction zone at start-up and (b) discontinuing step (a) after start-up.

15. A process according to claim 1 wherein said additive A comprises iron oxide; and said additive B comprises iron oxide in admixture with calcium oxide.

16. A process according to claim 1 including the further step of modifying the additive A or B by the addition of magnesium, chromium and mixtures thereof.

17. A process according to claim 16 wherein said magnesium, chromium and mixtures thereof are provided as compounds said compounds are selected from the group consisting of oxides, hydroxides, carbonates, bicarbonates, sulfates, nitrates and mixtures thereof and in a total amount of from 1.0 to 10.0 wt. % of said additive.

18. A process according to claim 17 wherein said magnesium and chromium compounds are oxides.

19. A process according to claim 1 wherein said liquid phase washing agent contains the following constituents in substantially the following wt. % ranges: iron sulfide from about about 75 to 95, nickel sulfide from 0.5 to 3.0, and iron oxide from about 2 to 9.

20. A process according to claim 1 wherein additive B comprises from about 30.0 to 90.0 wt. % of elemental iron, an iron compound and mixtures thereof and the remainder substantially comprises a calcium compound and said iron and calcium compound is selected from the group consisting of oxides, sulfides, sulfates, carbonates, cyanide, chlorides, nitrates, and mixtures thereof.

21. A process according to claim 1 including the further step of modifying additive B by the addition to it of at least one of magnesium, chromium and manganese in the total amount of about 1.0 to 10.0 wt. % of the additive.

22. A process according to claim 1 wherein additive B is used, and additive B contains manganese oxide.

23. The process of claim 1 provided with the step of introducing into a metal refining zone to recover nickel and vanadium, respectively the first portion of magnetic particles from step (5) and the third portion of magnetic particles from step (7).

24. The process of claim 1 provided with the step of recycling the second portion of magnetic particles from step (6) to step (1) as a portion of said additive for mixing with said fuel feedstock.

25. A process for the production of gaseous mixtures comprising $H_2+CO$ by the partial oxidation of a feedstock comprising a heavy liquid hydrocarbonaceous fuel having a nickel- and vanadium-containing ash and said feedstock includes a minimum of 0.5 wt. % of sulfur; and said ash includes a minimum of 5.0 wt. % vanadium, a minimum of 2.0 wt. % of nickel, and silicon; said process comprising:

(1) mixing together with said feedstock, additive A comprising an iron-containing additive when the silicon content of said feedstock is less than about 350 ppm, or additive B comprising an iron and calcium-containing additive when the silicon content of said feedstock is about 400 ppm or more; wherein the weight ratio of additive A or B to said ash is in the range of about 1.0–10.0 to 1.0, and for each part by weight of vanadium there is at least 10 parts by weight of iron when additive A is used, or at least 10 parts by weight of iron plus calcium when additive B is used;

(2) coking the mixture from (1) to produce petroleum coke having a nickel- and vanadium-containing ash and having dispersed therein said additive A or B;

(3) introducing the petroleum coke from (2) into a partial oxidation reaction zone as a pumpable slurry of petroleum coke in water, liquid hydrocarbonaceous fluid or mixtures thereof, or as substantially dry petroleum coke entrained in a gaseous transport medium;

(4) reacting the mixture from (1) at a temperature in the range of about 2200° F. to 3000° F. and a pressure in the range of about 5 to 250 atmospheres in a free-flow refractory-lined partial oxidation reaction zone with a free-oxygen containing gas in the presence of a temperature moderator and in a reducing atmosphere to produce a hot raw effluent gas stream comprising $H_2+CO$ and entrained molten slag including vanadium-containing oxide laths and spinels; and where in said partial oxidation reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of reaction zone; and when additive B is used separate portions of said iron- and calcium-containing additive (I) combine with a portion of said nickel, calcium and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase that fluxes substantially all of the remaining portion of said vanadium-containing oxide laths and spinels and other ash components;

(5) cooling and cleaning said hot raw effluent gas stream from (4) by direct contact with water in a quench zone to produce an aqueous suspension of slag and other small solid particles;

(6) grinding and drying the slag and other particulate solids from (5) to produce a ground heterogeneous mixture of particles having varying magnetic susceptibilities, and non-magnetic solid particles; wherein said ground heterogeneous mixture of particles has a particle size of less than 180 microns, and a moisture content of less than 3.0 wt. %;

(7) separating said ground heterogeneous mixture of particles from (6) by electromagnetic means including spaced apart poles by introducing a portion of said ground heterogeneous mixture of solid particles from (6) about 38 to 600 microns thick between the poles of said electromagnetic means having a low magnetic field strength in the range of about 10 to 1000 gausses, and separating a first portion of magnetic particles from a first residue mixture of magnetic and non-magnetic particles; wherein said first portion of magnetic particles comprises a heterogeneous mixture of particles of an Fe-Ni alloy and about 0 to 10 wt. % of magnetite particles; and said Fe-Ni alloy comprises about 70–95 wt. % Fe and the remainder Ni, and said Ni comprises about 40 to 85 wt. % of the total amount of nickel present in the ground mixture of solid particles from (6); and said first portion of magnetic particles comprises about 0.2 to 5.0 wt. % of the ground mixture of solid particles from (6);

(8) separating said heterogeneous mixture of particles from (7) by electromagnetic means including spaced apart poles by introducing a portion of said first residue mixture of magnetic and non-magnetic particles from (7) about 38 to 600 microns thick between the poles of said electromagnetic means having a medium magnetic field strength in the range of about 1,000 to 10,000 gausses, and separating a second portion of magnetic particles from a second residue mixture of magnetic and non-magnetic particles; wherein said second portion of magnetic particles comprises a heterogeneous mixture of particles which have a lesser magnetic susceptibility than that of the particles in said first portion of magnetic particles, and which comprises particles of a solid solution of Fe and Ni oxy-sulfide; about 0.1 to 2.0 wt. % of particles of vanadium compounds; and particles of iron silicate and calcium silicate; and said second portion of magnetic particles comprises about 85 to 98 wt. % of the ground mixture of solid particles from (6) and contains about 70 to 95 wt. % of the iron; and (9) separating said heterogeneous mixture of particles from (8) by electromagnetic means including spaced apart poles by introducing a portion of said second residue mixture of magnetic and non-magnetic particles from (8) about 38 to 600 microns thick between the poles of said electromagnetic means having a high magnetic field strength in the range of about 8,000 to 40,000 gausses, and separating a third portion of magnetic particles from a third residue mixture of particles; wherein said third portion of magnetic particles comprises a heterogeneous mixture of particles which have a lesser magnetic susceptibility than that of the particles in said second portion of magnetic particles, and which comprises particles of a vanadium-containing spinel; and a mixture of particles comprising at least one metal silicate wherein the metal in said metal silicate is selected from the group consisting of iron, magnesium, aluminum, calcium, and mixtures thereof; and said third portion of magnetic particles comprises about 1 to 14 wt. % of the ground mixture of solid particles from (6) and contains about 60 to 98 wt. % of the vanadium in said mixture from (6).

26. A process according to claim 25 wherein said ash-containing heavy liquid hydrocarbonaceous fuel is a high boiling liquid petroleum feed or to the bottoms from a vacuum tower or a fractionator.

27. A process according to claim 25, where in step (2) the mixture from step (1) is introduced at a temperature in the range of from about 650° F. to 930° F. into a delayed coking zone where at a temperature in the range from about 800° to 895° and a pressure in the range of from about 20 to 60 psig, uncondensed hydrocarbon effluent vapous and steam are removed overhead and said petroleum coke having a nickel- and vanadium-containing ash and having uniformly dispersed therein said iron-containing additive is removed from the bottom.

* * * * *